United States Patent [19]

Kataoka et al.

[11] Patent Number: 4,572,644
[45] Date of Patent: Feb. 25, 1986

[54] COMPUTER TYPE ELECTRONIC FLASH DEVICE

[75] Inventors: Hiroyuki Kataoka, Saitama; Masanori Yamada; Nobuyuki Suzuki, both of Kanagawa, all of Japan

[73] Assignee: Canon Kabushiki Kaisha, Tokyo, Japan

[21] Appl. No.: 658,442

[22] Filed: Oct. 5, 1984

Related U.S. Application Data

[63] Continuation of Ser. No. 447,508, Dec. 7, 1982.

[30] Foreign Application Priority Data

Dec. 14, 1981 [JP] Japan ................................. 56-201134
Dec. 14, 1981 [JP] Japan ................................. 56-201135
Jan. 6, 1982 [JP] Japan ..................................... 57-803

[51] Int. Cl.⁴ ......................... G03B 7/00; G03B 15/05
[52] U.S. Cl. ................................. 354/415; 354/145.1; 354/416
[58] Field of Search ...................... 354/415, 145.1, 416, 354/417

[56] References Cited

U.S. PATENT DOCUMENTS

| | | |
|---|---|---|
| 3,418,904 | 12/1968 | Wick et al. . |
| 3,648,104 | 3/1972 | Ackermann ........................... 354/33 |
| 3,842,428 | 10/1974 | Kawasaki ............................. 354/33 |
| 4,024,549 | 5/1977 | Matsumoto .......................... 354/139 |
| 4,349,260 | 9/1982 | Ishida et al. ......................... 354/415 |
| 4,367,023 | 1/1983 | Ishida et al. ......................... 354/415 |
| 4,373,793 | 2/1983 | Taniguchi et al. ................... 354/415 |
| 4,457,611 | 7/1984 | Ishida et al. ......................... 354/415 |
| 4,465,353 | 8/1984 | Yoshida et al. ..................... 354/415 |
| 4,484,807 | 11/1984 | Kataoka et al. ..................... 354/415 |

Primary Examiner—Russell E. Adams
Attorney, Agent, or Firm—Toren, McGeady, Stanger, Goldberg & Kiel

[57] ABSTRACT

In the disclosed electronic flash, camera operation at various depths of field is made possible by producing a diaphragm-setting signal in response to a preliminary flash directed at a preliminary object, converting this signal to a digital value, and adjusting the main flash in response to light reflected from a main object and in response to the digitally memorized diaphragm setting signal.

17 Claims, 10 Drawing Figures

4,572,644

COMPUTER TYPE ELECTRONIC FLASH DEVICE

This is a continuation of application Ser. No. 447,508, filed Dec. 7, 1982.

BACKGROUND OF THE INVENTION

1. Field of the Invention

This invention relates to a computer type electronic flash device arranged to automatically control the quantity of light of a flash according to a distance to an object to be photographed and more particularly to an electronic flash device in which a light level is controlled by generating preliminary flash before main flashing is produced. For simplicity this computer type electronic flash device is referred to herein as an electronic flash and an electronic flash unit as well as an electronic flash device.

2. Description of the Prior Art

Various electronic flash devices of this kind have been proposed. In such electronic flash devices, the quantity of light reflected from a preliminary flash is integrated and the device produces signal for controlling the aperture of a camera's photo-taking lens on the basis of the integration and another signal. This serves for adjusting the light control level of the device to a level corresponding to the aperture size controlling signal. It is an advantage of the conventional devices of this kind that they adjust the aperture of the lens to a smaller size when the object is closer to the camera and hence, produce a proper exposure over a wide range up to a long distance to the object. However, a disadvantage of the conventional devices on the other hand resides in that a considerable amount of light energy is wastefully discharged even for an object located close to the camera and this inevitably results in a prolonged interval between one flash and another, or in other words, a longer recycle time.

SUMMARY OF THE INVENTION

It is therefore an object of the present invention to provide an electronic flash device which has a shorter recycle time than the prior art devices.

It is another object of the invention to provide an electronic flash device which not only is capable of giving a proper degree of exposure even for an object located at a long distance but also has a short recycle time.

It is a further object of the invention to provide an electronic flash device which is arranged to have a preliminary flashing action thereof triggered from the camera side.

It is a still further object of the invention to provide an electronic device which performs a preliminary flashing action only when preparation for flashing is completed.

A feature of the invention resides in that a preliminary flashing action and a main flashing action of the electronic flash device are arranged to be individually triggered in such a manner that a large aperture size can be designated even for an object located at a short distance so that the recycle time of the device can be shortened.

These and further objects and features of the invention will become apparent from the following detailed description of embodiments thereof taken in connection with the accompanying drawings.

DETAILED DESCRIPTION OF PREFERRED EMBODIMENTS

Figure 1:
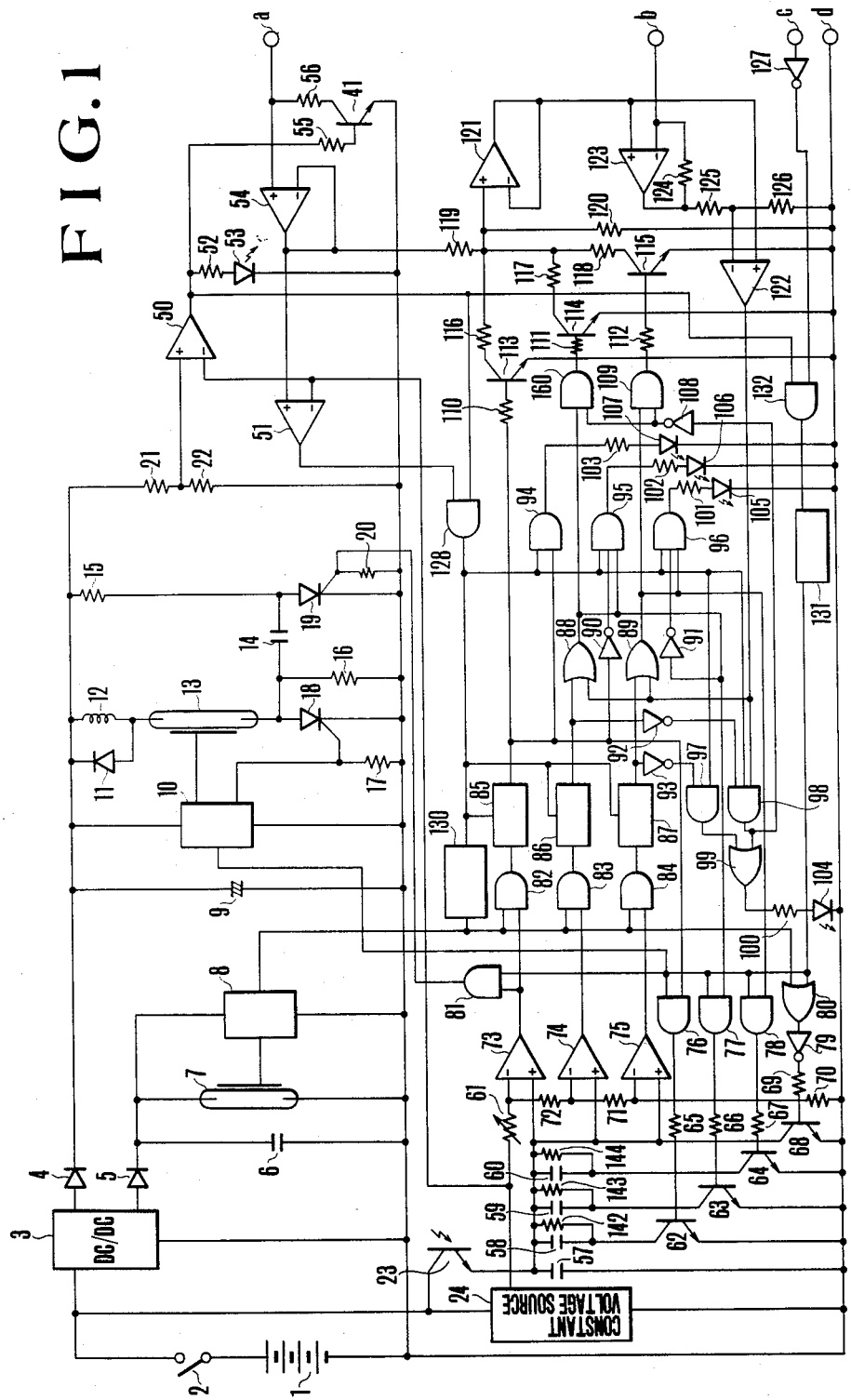
FIG. 1 is a circuit diagram of an electronic flash device in an electronic flash photographing system embodying the present invention.

Referring to FIG. 1 which shows circuit arrangement of an electronic flash device arranged in an electronic flash photographing system according to the present invention, the device includes a normally open type power supply switch 2 which is connected in series with a battery 1. To the switch 2 is connected a known DC-DC converter 3 which boosts a low voltage of the battery 1. Two rectifying diodes 4 and 5 are connected to the converter 3. The anode of a main thyristor 18 is connected to the cathode side of the diode 4 through a coil 12 and a main discharge tube 13 which is provided for flash photographing. To the cathode side of the diode 5 is connected a parallel circuit consisting of an auxiliary discharge tube 7 for distance measurement and an auxiliary capacitor 6 which is arranged to supply the discharge tube 7 with a flashing energy. A trigger circuit 8 is connected to the trigger electrode of the auxiliary discharge tube 7. The trigger circuit 8 has a monostable multivibrator 130 connected to the input terminal thereof. A main capacitor 9 for accumulating a flashing energy is parallel connected to the main discharge tube 13. Meanwhile, a known trigger circuit 10 is connected to the trigger circuit of the main discharge tube 13. The second output terminal of the trigger circuit 10 is connected to the gate of the main thyristor 18 and also to a resistor 17 which is connected to the gate.

Resistors 15 and 16 form a charging path for a commutation capacitor 14. Of these resistors, the resistor 15 is connected to the anode of an auxiliary thyristor 19 which is arranged for cutting off the main thyristor 18. A resistor 20 is connected to the gate of the auxiliary thyristor 19. Resistors 21 and 22 for a voltage dividing circuit are connected in parallel to the main capacitor 9 for the purpose of detecting the charge voltage of the main capacitor 9. There is provided a photo-transistor 23 for receiving a reflection light from an object to be photographed (not shown). A constant voltage power source 24 and a capacitor 57 for distance measurement are respectively connected to the photo-transistor 23. A comparator 50 is connected to the output terminal of the above stated voltage dividing circuit 21 and 22. The negative input terminal (−) of this comparator 50 and that of another comparator 51 are respectively connected to the output terminal of the constant voltage power source 24 for the purpose of receiving a reference voltage therefrom. A light emitting diode (hereinafter called an LED for short) 53 is connected to the output terminal of the comparator 50 through a resistor 52 for the purpose of indicating completion of a charging process on the main capacitor 9. A buffer circuit 54 is connected to a connection terminal a which is arranged to be connected to a corresponding connection terminal provided on the camera side as will be further described later herein. The output terminal of this buffer circuit 54 is connected to the positive input terminal (+) of the comparator 51 which is arranged to detect whether or not a shutter release button of the camera is depressed to a first stroke position thereof as will be further described later herein.

An npn transistor 41 is connected to the terminal a through a resistor 56. The base of this transistor 41 is connected to the output terminal of the comparator 50 through a resistor 55 while the emitter thereof is connected to the negative electrode of the battery 1. A capacitor 58 is series connected to a switching transistor 62 and is arranged to form a first time constant circuit of a light measurement circuit in a flash light quantity control circuit. Another capacitor 59 is series connected to a switching transistor 63 and is arranged to form a second time constant circuit of the light measurement circuit in the flash light quantity control circuit. A further capacitor 60 is series connected to a switching transistor 64 and is arranged to form a third time constant circuit of the light measurement circuit for controlling the flash light quantity. Discharging resistors 142, 143 and 144 are respectively connected to these capacitors 58, 59 and 60.

These transistors 62, 63 and 64 respectively have base resistors 65, 66 and 67 connected to their bases. An npn transistor 68 is provided for the purpose of actuating the light measurement circuit concurrently with the starts of preliminary flashing and main flashing and is arranged to assume a non-conductive state at the same time as the starts of these flashing actions. The transistor 68 has a resistor 69 connected to the base thereof. Comparators 73, 74 and 75 are arranged for selection of a light control level, i.e. for selection of an aperture value to be employed. Resistors 70, 71 and 72 are connected to these comparators 73-75 to supply them with a reference voltage. A resistor 61 is arranged to vary its resistance value according to the setting value of film sensitivity. AND gates 76, 77 and 78 are respectively connected to the bases of the transistors 62, 63 and 64 through the resistors 65, 66 and 67 and are arranged to render one of these transistors 62-64 conductive in synchronism with the occurrence of a flashing trigger signal which will be described later herein. An OR gate 80 is connected to the base of the switching transistor 68 through a resistor 69. An AND gate 81 is connected between the comparator 73 and the auxiliary thyristor 19 to guide to the gate of the auxiliary thyristor 19 a flashing stop signal produced from the comparator 73. AND gates 82, 83 and 84 are arranged to guide light control level selection signals, or aperture value selection signals, produced from the comparators 73, 74 and 75 to latch circuits 85, 86 and 87. The output terminal of the AND gate 82 is connected to the gate of a thyristor forming the latch circuit 85. The output termianl of the AND gate 83 is connected to the gate of a thyristor forming the latch circuit 86. The output terminal of the AND gate 84 is connected to the gate of a thyristor forming the latch circuit 87. The latch circuits 85-87 are thus composed of the thyristors as mentioned above. The anode of the thyristor forming the latch circuit 85 is connected to the output terminal of an AND gate 128 while the cathode thereof is connected to the base of the transistor 113 through a resistor 110. The anode of the thyristor forming the latch circuit 86 is connected to the output terminal of the AND gate 128 and the cathode thereof to the base of the transistor 114 through the OR gate 88, an AND gate 160 and the resistor 111. Further, the thyristor forming the latch circuit 87 has its anode connected to the output terminal of the AND gate 87 and the cathode thereof to an OR gate 89.

Reference numerals 90-93 indicate inverters. Numerals 105-107 indicate LED's which are connected to AND gates 94-96 through resistors 101-103. These LED's are arranged to display a selected light control level, i.e. an aperture value, prior to main flashing. An inverter 108 is connected to AND gates 109 and 160. Base resistors 110-112 are connected to the bases of the npn transistors 113-115. Resistors 116-118 are arranged to produce a voltage corresponding to the selected aperture value. A numeral 119 indicates a resistor. A voltage dividing circuit forming resistor 120 is connected in parallel with the resistors 116-118. A numeral 121 indicates a buffer circuit; 122 indicates a comparator arranged to judge a signal which is representative of the full-open F-number of a lens in use and is supplied from the camera side through a terminal b; 125 and 126 indicate resistors arranged to form a voltage dividing circuit for supplying the negative input terminal of the comparator 122 with a reference voltage; 123 indicates an operational amplifier; 124 indicates a resistor which is connected to the terminal b for transmitting an aperture value signal to the camera side and also to the negative input terminal of the operational amplifier 123; 127 indicates an inverter connected to a synchronization terminal c for a flashing trigger signal and also to the input terminal of an AND gate 132; 128 indicates an AND gate; 131 indicates a monostable multivibrator (hereinafter will be called the one-shot circuit) which is connected to the OR gate 80; 97 and 98 indicate AND gates; and 104 indicates an LED which is connected to an OR gate 99 through a current limiting resistor 100 and is arranged to give a warning against an under exposure. The flash device further includes a terminal a which is arranged to receive a constant voltage from the camera side when the release button of the camera is depressed to the first stroke position thereof and to transmit a shutter time change-over signal to the camera side upon completion of a charging process for the main capacitor 9. Another terminal b is arranged to transmit a voltage corresponding to the selected aperture value signal from the flash device to the camera side and also to transmit the full-open aperture value signal which comes from the camera side representing the full-open aperture of the photo-taking lens in use to a processing circuit of the flash device. In addition to the terminals a and b, there are provided a known synchronization terminal c and a ground terminal d.

Figure 2A:
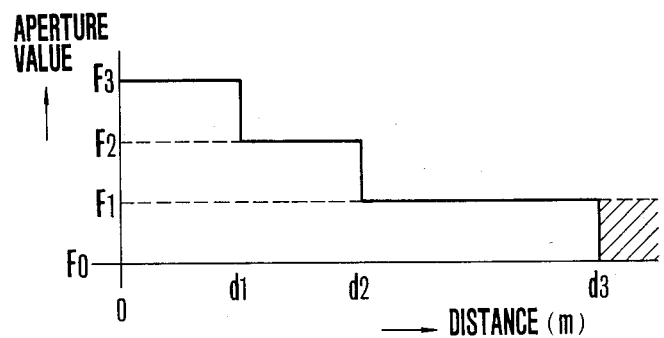
FIGS. 2(a) and 2(b) and FIGS. 3(a), 3(b) and 3(c) are illustrations of the operation of the electronic flash device shown in FIG. 1.
Figure 2B:
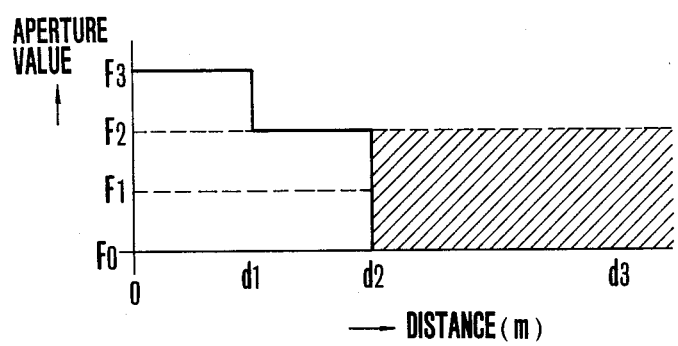
Figure 3A:
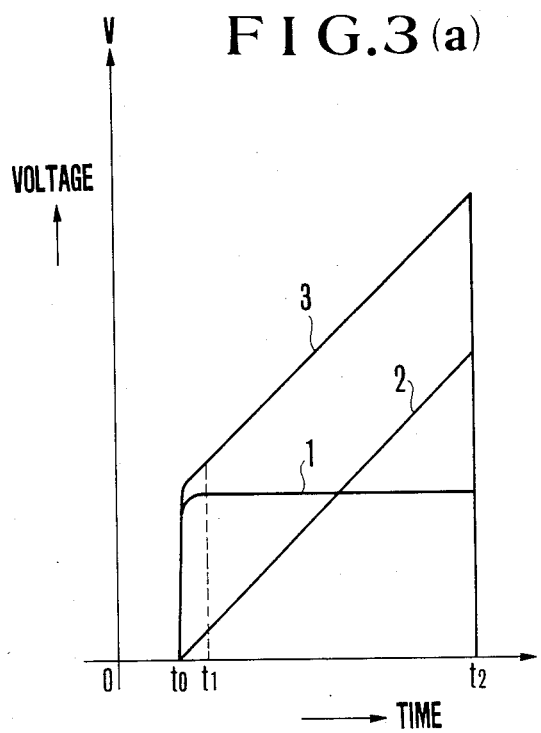
Figure 3B:
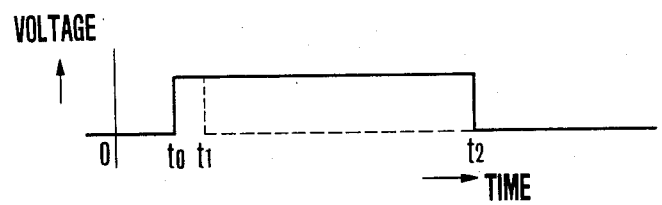
Figure 3C:
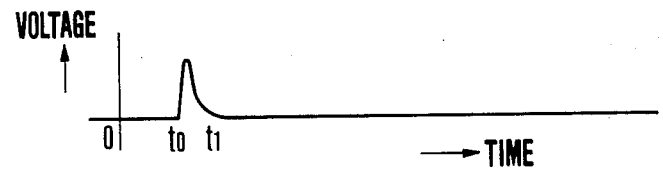

For better understanding of the present invention, the operation of the electronic flash device is described below with reference to FIGS. 1, 2 and 3 before a description of the camera to be used in the flash photographing system:

The relation of the distance from the electronic flash device to the object to be photographed to the aperture value to be selected for flash photographing is as shown in FIGS. 2(a) and 2(b). In these drawings, the abscissa indicates the distance and the ordinate the aperture value. Meanwhile, FIG. 3(a) shows the charge voltage characteristic of the distance measuring capacitor 57 with the abscissa indicating time and the ordinate indicating the charge voltage value. FIG. 3(b) shows the output wave form of the one-shot circuit 130 while FIG. 3(c) shows the discharge characteristic of the auxiliary discharge tube 7. The following description is based on the assumption that the photo-taking lens mounted on the camera is a bright lens and, accordingly, the output of the comparator 122 and that of the AND gate 98 are at a low level (hereinafter will be called LL for short) while the output of the inverter 108 is at a high level (hereinafter will be called HL for short).

After the electronic flash device shown in FIG. 1 is mounted on a hot shoe (not shown) of the camera, when the power supply switch 2 is closed, the DC-DC converter 3 and the constant voltage source 24 begin to operate. The main capacitor 9 and the auxiliary capacitor 6 then begin to be charged. When the charge voltage level of the main capacitor 9 reaches a predetermined value, the level of the output of the comparator 50 changes from LL to HL. Then, the LED 53 lights up to show that the process of charging the main capacitor 9 has been completed. An HL voltage is then impressed on the base of the transistor 41 to render the transistor 41 conductive. Following this, when the photographer depresses the shutter release button which will be described later herein to the first stroke position thereof (with the button in this position, the shutter is not released nor is an aperture adjusting action on the photo-taking lens began, as will be further described later herein, but only the light measurement circuit and display circuit or the like of the camera begin to operate), a constant voltage is impressed on the terminal a through the hot shoe of the camera. With the constant voltage impressed, the transistor becomes conductive to change the mode of a shutter time control circuit provided within the camera from a natural light photographic mode to a flash light photographic mode as will be further described later herein. Meanwhile, the constant voltage produced at the terminal a is also impressed on the positive input terminal (+) of the comparator 51 through the buffer circuit 54. This causes the level of the output of the comparator from LL to HL. The level of the output of the AND gate 128 also changes from LL to HL. With the level of the output of the AND gate 128 changed to HL, the one-shot circuit 130 is triggered to produce an HL output voltage over a preset period of time about several tens of $\mu s$. When pulses are thus produced from the one-shot circuit 130, the trigger circuit 8 is immediately triggered and produces a trigger pulse from its output terminal to trigger the auxiliary discharge tube 7 therewith. Since the auxiliary capacitor 6 has been charged to a sufficiently high voltage by then, a current flows to the auxiliary discharge tube 7 from the capacitor 6 in response to the trigger pulse from the trigger circuit 8. A preliminary flash thus beings.

Meanwhile, since the pulses from the one-shot circuit 130 are also impressed on the AND gates 82-84 and the OR gate 80, the AND gates 82-84 come to assume a holding state. The transistor 68 becomes non-conductive. The short-circuit of the distance measuring capacitor 57 is thus removed. The light measurement circuit for distance measurement begins to operate concurrently with the start of the above stated preliminary flashing. Further, at this point of time, the synchronization terminal c has no flashing trigger signal of LL impressed thereon. Therefore, all the transistors 62-64 are kept in a non-conductive state and all the light controlling capacitors 58-60 remain inoperative. When the light projected from the discharge tube 7 by the start of preliminary flashing is reflected by the object to be photographed and reaches the photo-transistor 23, the output voltage of the distance measuring capacitor 57 increases with time according to a photo-current flowing through the photo-transistor 23. Even after termination of the flash of the discharge tube 7, the charge voltage of the capacitor 57 increases according to the intensity of a natural light illuminating the object to be photographed as shown in FIG. 3(a). In FIG. 3, a curve 1 represents variations of the charge voltage of the capacitor 57 where light measurement is performed for a period of about several tens of $\mu s$ while the natural light illuminating the object is of a low brightness and the object is located at a medium distance. A curve 2 represents the variations where the light measurement time is the same and the natural light is of a high brightness while the object is located at a long distance. Another curve 3 represents the variations which occur in another case where the light measurement time is the same and the object is located at a medium distance while the natural light is of a high brightness. The charge voltage of the capacitor 57 during such a distance measurement process is latched at the latch circuits 85-87 as distance information with the level of the output of the one-shot circuit 130 arranged to change to LL about several tens of $\mu s$ after the commencement of preliminary flashing. In the case where the object is located within a distance range of d2 (m)-d3 (m) as shown in FIG. 2(a) and only the level of the comparator 75 is caused to become HL by the charge voltage of the capacitor 57, the level of the output of the latch circuit 87 alone becomes HL. Therefore, the levels of the outputs of the OR gate 89 and the AND gate 109 respectively become HL to render the transistor 115 conductive alone. As a result of that, the resistor 118 is parallel connected to the resistor 120. Assuming that the resistor 118 is arranged to be used for setting an aperture value F1 representing an F-number such as F 2.0, the parallel connection of the resistor 118 to the resistor 120 causes the potential of the positive input terminal of the buffer circuit 121 to lower according to the resistance value of the parallel connected resistor 118. This in turn causes the potential of the non-inversion input terminal of the amplifier 123 to lower accordingly. Then, at the terminal b, this produces a voltage which causes the aperture of the photo-taking lens of the camera to be adjusted to a position corresponding to the aperture value F1.

When the level of the OR gate 89 becomes HL as mentioned above, the AND gate 78 and the transistor 64 respectively become HL and conductive. In other words, the electronic flash device becomes ready for setting the flash light quantity control circuit at the above stated aperture value F1.

Further, when the level of the OR gate 89 becomes HL as mentioned above, the level of the output of the AND gate 128 becomes HL and that of the latch circuit 86 becomes LL. Therefore, the level of the output of the AND gate 96 also becomes HL. Then, the LED 105 lights up to inform the photographer beforehand that the aperture of the photo-taking lens of the camera and the light control level (aperture value) of the flash device are going to be adjusted to the above stated aperture value F1.

If the distance to the object to be photographed is within the range from d2 (m)-d1 (m) as shown in FIG. 2(a) and the levels of the outputs of the comparators 75 and 74 are caused to become HL by the charge voltage of the capacitor 57, the outputs of the latch circuits 86 and 87 become HL. This causes the outputs of the AND gates 160 and 109 to become HL through the OR gates 88 and 89. The HL outputs of the AND gates 160 and 109 render the transistors 114 and 115 conductive to have the aperture value setting resistors 117 and 118 parallel connected to the resistor 120 of the voltage dividing circuit. With the resistors 117 and 118 parallel connected to the resistor 120, the potential of the positive input terminal of the buffer circuit 121 drops according to the resistance values of the two resistors 117 and 118 parallel connected to the resistor 120. The potential of the non-inversion input terminal of the amplifier 123 also drops accordingly.

As a result of this, there is produced at the terminal b a voltage of such a value that adjusts the aperture of the photo-taking lens to a smaller aperture F2 as shown in FIG. 2(a) corresponding, for example, to F 4.0.

Further, with the levels of the OR gates 88 and 89 becoming HL as mentioned above, the level of one of input terminals of each of AND gates 77 and 78 becomes HL to render the transistors 63 and 64 conductive. In other words, the electronic flash device becomes ready for setting the aperture value at the above stated aperture value F2.

When the levels of the OR gates 88 and 89 change to HL as mentioned above, the level of the output of the AND gate 128 becomes HL and that of the output of the latch circuit 85 LL while that of the output of only the gate 95 among the AND gates 94–96 becomes HL. The LED 106 lights up to inform the photographer beforehand that the aperture of the photo-taking lens and the light control level (aperture value) of the flash device are going to be adjusted to the above stated aperture value F2.

In the case where the distance to the object is within the range d1 (m)–0 (m) and the levels of the outputs of the comparators 73, 74 and 75 are caused to become HL by the charge voltage of the capacitor 57, the outputs of all the latch circuits 85–87 become HL. Accordingly, the outputs of the OR gates 88 and 89 and those of the AND gates 109 and 160 become HL to render the transistors 113–115 conductive and thus to have the aperture value setting resistors 116, 117 and 118 parallel connected to the resistor 120 of the voltage dividing circuit. With the resistors 116–118 parallel connected to the resistor 120, the potential of the positive input terminal of the buffer circuit 121 comes to drop according to the resistance values of the resistors 116–118 parallel connected to the resistor 120. Then, the potential of the non-inversion input terminal of the amplifier 123 also drops according as that of the positive input terminal of the buffer circuit 121 drops.

Then, at the terminal b, there is produced a voltage of a value that adjusts the aperture of the photo-taking lens to a still smaller aperture value than the above stated aperture value F2 (see FIG. 2(a)), i.e. to F3 as shown in FIG. 2(a), which corresponds, for example, to F 8.0.

When the level of the output of the latch circuit 85 and those of the outputs of the OR gates 88 and 89 respectively become HL as mentioned above, one of the input terminals of each of the AND gates 76, 77 and 78 become HL to render the transistors 62–64 conductive. In other words, the electronic flash device becomes ready for setting the aperture value at the above stated aperture value F3.

When the level of the output of the latch circuit 85 becomes HL, the LED 107 alone lights up as the level of the output of the AND gate 128 is HL. This informs the photographer beforehand that the aperture of the photo-taking lens and the light control level (aperture value) of the flash device are going to be adjusted to the above stated aperture value F3. In this case, since the output of the latch circuit 85 is at an HL, the output of the inverter 90 is at an LL. Accordingly the level of the output of the AND gate 95 becomes LL and the LED 106 does not light up.

Since the output of the latch circuit 86 is at an HL at that instant as mentioned above, the output of the OR gate 88 is at an HL and that of the inverter 91 at an LL. Accordingly, the level of the output of the AND gate 96 becomes LL and the LED 105 also does not light up.

Under this condition, if the shutter release button which will be further described later herein is released from the depressing operation and after that again is depressed to the first stroke position thereof, a predetermined constant voltage is impressed on the terminal a from the camera side. Then, if at that instant the charging process on the main capacitor 9 has been completed, again preliminary flashing is performed to carry out once again the distance measuring action in the same manner as mentioned in the foregoing.

In case where a dark lens, such as a lens of F 2.8, is mounted on the single lens reflex camera which is not shown, the embodiment operates as described below:

With the dark lens mounted on the camera, the potential of the positive input terminal (+) of the comparator is higher than that of the negative input terminal thereof. Therefore, the level of the output terminal of the comparator 122 becomes HL to force the levels of the output terminals of the OR gates 88 and 89 to become HL. After completion of the charging process on the main capacitor 9, when the shutter release button (not shown) is depressed to the first stroke position, the level of the output terminal of the AND gate 128 becomes HL in the same manner as in the case described in the foregoing. This triggers the one-shot circuit 130 to have it produce an HL signal for a length of time about several tens of $\mu$s. The transistor 68 is changed to a non-conductive state as mentioned in the foregoing. This renders the distance measurement light measuring circuit operative.

Meanwhile, when the HL signal is produced from the one-shot circuit 130, the discharge tube 7 flashes to perform the preliminary flashing action in the same manner as described in the foregoing.

In this instance, if the object to be photographed is located at a distance longer than a distance d3 shown in FIG. 2(b) and thus none of the comparators 73, 74 and 75 do not change to HL even after the lapse of the time of about several tens of $\mu$s determined by the output of the one-shot circuit 130, the LL output of the latch circuit 85 keeps the transistor 113 in a non-conductive state. Further, in this instance, the outputs of the AND gates 160 and 109 are at LL because the output of the latch circuit 85 is at LL, the output of the AND gate 98 at HL and that of the inverter 108 at LL. Therefore, in the case of such an object, all the transistors 113–115 for determining the aperture value of the photo-taking lens (not shown) remain non-conductive. Then, a voltage corresponding to an aperture value F0 (see FIG. 2(b)) which corresponds, for example to F 1.0 and which is determined by the voltage dividing ratio of the voltage dividing circuit 119 and 120 is transmitted through the terminal b to the aperture control circuit of the camera which will be described later herein. Since the output of the latch circuit 87 is at LL and that of the AND gate 97 at HL at that instant as mentioned in the foregoing, the LED 104 lights up to inform or warn the photographer that under-exposed flash photographing will be performed. Besides, since the outputs of the OR gates 88 and 89 are forced to be HL when the object is in the above stated condition, an HL input is impressed on one of the input terminals of each of the AND gates 77 and 78 to render the transistors 63 and 64 conductive. In other words, at the light measurement circuit of the flash light quantity control circuit (or light control circuit), the capacitors 59 and 60 are selected. As a result of that, there obtains a condition where the aperture value F2 can be selected for the light control level.

Next, if the object to be photographed is located at a distance within the range of d2-d3 (see FIG. 2(b)) and the level of the output of the comparator 75 solely changes to an HL, the transistor 113 remains in a non-conductive state in the same manner as in the case described above. Further, the output of the inverter 108 is at LL as mentioned above and the outputs of the AND gates 160 and 109 are also at LL, the transistors 114 and 115 also remain non-conductive in this case. Accordingly, a voltage corresponding to the aperture value F0 determined by the voltage dividing ratio of the voltage dividing circuit 119 and 120 is produced through the terminal b to the camera side also in this case. Further, since the output of the latch circuit 86 is at LL and that of the AND gate 98 at HL in this case, the LED 104 lights up to inform the photographer also in this case that under-exposed flash photographing will be carried out. Meanwhile, the light measurement circuit of the light control circuit comes to assume a condition where the aperture value F2 can be selected.

Where the object is located at a distance within the range of d1-d2 (see FIG. 2(b)) and only the levels of the outputs of the comparators 74 and 75 changes to HL, the transistor 113 remains non-conductive in the same manner as in the preceding case. Meanwhile, when the HL output of the comparator 74 causes the level of the output of the latch circuit 86 to change to HL, the level of the inverter 92 becomes LL; that of the output of the AND gate 98 become LL; and that of the output of the inverter 108 becomes HL. Accordingly, the level of the output of the AND gate 160 become HL concurrently with the change of the output of the latch circuit 86 to HL. The transistor 114 then becomes conductive to parallel connect the resistor 117 to the resistor 120. The level of the output of the AND gate 109 also becomes HL concurrently with the change of the output level of the latch circuit 87 to HL. This causes the resistor 118 to be also parallel connected to the resistor 120. Therefore, a voltage corresponding to the aperture value F2 which is determined by the voltage dividing ratio of the voltage divider circuit 117, 118, 119 and 120 is produced through the terminal b to the camera side. Meanwhile, the HL outputs of both the latch circuits 86 and 87 cause the LED 104 to be extinguished to inform the photographer that flash photographing will be performed with a proper exposure. The light measurement circuit of the light control circuit in this case also come to assume a condition in which the aperture value F2 can be selected.

Where the object is located at a distance within the range of 0-d1 as shown in FIG. 2(b) to cause the levels of all the comparators 73-75 change to HL, the HL output of the latch circuit 86 causes the level of the output of the inverter 108 to become HL as mentioned in the foregoing. Therefore, the levels of the AND gates 160 and 109 change to HL concurrently with the change of the output levels of the latch circuits 86 and 87 to HL. The HL otuputs of the AND gates 160 and 109 then parallel connect the aperture value setting resistors 117 and 118 to the resistor 120. Further, since the level of the output of the latch circuit 85 changes to HL in this case, the transistor 113 becomes conductive to parallel connect the resistor 116 to the resistor 120. Therefore, the amplifier 123 produces a voltage corresponding to the aperture value F3 determined by the voltage dividing ratio of the voltage divider circuit 116-120 and supplies the voltage to the camera side through the terminal b. The LED 104 does not light up also in this case. Since the outputs of all the latch circuits 85-87 are at HL, the light measurement circuit of the light control circuit comes to assume a condition in which the aperture value F3 can be selected.

With the preliminary flash action performed and after confirmation of the preliminary flash and completion of the light control level setting process as have been described in the foregoing, depressing the shutter release button to its second stroke position causes a mirror (not shown) to be lifted up as will be further described. In the meantime, the diaphragm aperture of the photo taking lens (not shown) is determined on the basis of the aperture value information predetermined through the preliminary flash. After these and other known actions, the shutter (not shown) is fully opened. The synchronization terminal c is grounded when the synchronizing contact which is not shown is operated. The output level of the AND gate 132 changes to HL to trigger the one-shot circuit 131. The one-shot circuit 131 then generates an HL signal for a length of time required for flash photographing, such as 5 to 6 ms. The transistor 68 which has become conductive in synchronism with the rise of the signal from the one-shot circuit 130 again changes to a non-conductive state to render the light measurement circuit of the light control circuit operative.

Since the signal from the one-shot circuit 131 is arranged to trigger the trigger circuit 10, electric energy is supplied in a known manner from the main capacitor 9 to the main discharge tube 13. The main discharge tube 13 then flashes to illuminate the object to be photographed. The main flash is started in this manner. When a reflection which results from the main flash and comes from the object enters the photo-transistor 23, the capacitor 57 of the distance measuring light measurement circuit and another capacitor, such as the capacitor 60, which is selected at the time of preliminary flash, begin to charge. When these capacitors 57 and 60 are charged up to a predetermined level, the level of the output of the comparator 73 changes to an HL. The output of the AND gate 8 then becomes HL to trigger the thyristor 19 to interrupt main flash to terminate the flash photography at a proper exposure.

In the foregoing description of operation of the electronic flash device according to the invention, the preliminary flash action of the flash device is directed to the object to be photographed. However, in cases where the object is located at a distance within the distance range of d1 (m)-0 (m) as shown in FIG. 2(a), the preliminary flashing action may be intentionally directed to something, such as a wall or a tree other than the object, located at a longer distance which is, for example, within a longer range d3 (m)-d2 (m) as shown in FIG. 2(a). In that case electronic flash device operates in the following manner:

When the charge voltage of the capacitor 57 causes the output level of the comparator 75 alone to become HL with the above stated wall or tree located at a distance within the range d3 (m)–d2 (m), it is only the output level of the latch circuit 87 that becomes HL. Accordingly, the output levels of the output terminals of the OR gate 89 and the AND gate 109 respectively become HL. This causes the transistor 115 alone to become conductive to parallel connect the resistor 118 to the resistor 120. Assuming that the resistor 118 is arranged for setting an aperture value F1 corresponding, for example, to F 2.0, when the resistor 118 is parallel connected to the resistor 120, the potential of the positive input terminal of the buffer circuit 121 drops according to the resistance value of the parallel resistor 118 and the potential of the non-inverting input terminal of the amplifier 123 also drops accordingly. As a result of that, a voltage that causes the aperture of the photo-taking lens of the camera to be adjusted to the aperture value F1 is produced at the terminal b.

When the output level of the OR gate 89 becomes HL as mentioned above, the output level of the AND gate 78 and the transistor 64 become HL and conductive respectively. In other words, the flash device assumes a condition such that the flash's light quantity control circuit can be set at the aperture value F1.

Further, when the output level of the OR gate 89 becomes HL as mentioned above, the output level of the AND gate 128 becomes HL and that of the latch circuit 86 LL. Therefore, the output level of the AND gate 96 also becomes HL. The LED 105 comes to light up to inform the photographer that the aperture of the photo-taking lens of the camera and the light control level (or aperture value) of the flash device will be adjusted to the above stated aperture value F1.

With the preliminary flash action performed, completion of the action for setting the photo-taking lens and the light control level of the flash device after the preliminary flashing is confirmed in the manner as described above. Following that, when the shutter release button is depressed to the second stroke position thereof with the camera directed toward the object which is to be photographed and is located at the distance within the range d1 (m)–0 (m), a mirror (not shown) is lifted as will be further described later herein and the aperture size of the photo-taking lens (not shown) is determined on the basis of the aperture value information predetermined through the above stated preliminary flash. After that, when the shutter (not shown) is fully opened and a synchronizing contact (not shown) operates, the synchronization terminal c is grounded; the output level of the AND gate 132 changes to an HL; the one-shot circuit 131 is triggered; and the one-shot circuit then produces an HL signal for a length of time, such as 5 to 6 ms, required for flash photography. Therefore, the transistor 68 which has become conductive in synchronism with the rise of a signal from the one-shot circuit 130 is again caused to become non-conductive to bring the light measurement circuit of the light control circuit into an operative state.

Since the signal from the one-shot circuit 131 triggers the trigger circuit 10, an electric energy is supplied from the main capacitor 9 to the main discharge tube 13 in a known manner. With the energy thus supplied, the main discharge tube flashes to illuminate the object. With the main flashing action thus started, when a reflection light from the object resulting from this flashing comes to the photo-transistor 23, the capacitor 57 of the distance measuring light measurement circuit and the capacitor 64 which is selected at the time of preliminary flashing begin to be charged. When these capacitors 57 and 64 are charged up to a predetermined level to cause the output level of the comparator 73 to change to an HL, the output level of the AND gate 81 changes to an HL. This triggers the thyristor 19 to interrupt the main flashing action to terminate the flash photographing operation with a proper exposure. In this case, despite of that the distance to the object is within the range d1 (m)–0 (m), the flash light quantity control circuit is set at the aperture value F1 instead of the aperture value F3 because of the intention as mentioned above. Therefore, the main flashing action in this case is interrupted in a shorter period of time than in other cases where preliminary flashing is directed toward the object to be photographed and accordingly the flash light quantity control circuit is set at the aperture value F3. In this case, therefore, the electric energy discharged from the main capacitor 9 is saved and the recycle time of the electronic flash device is shortened.

Figure 4:
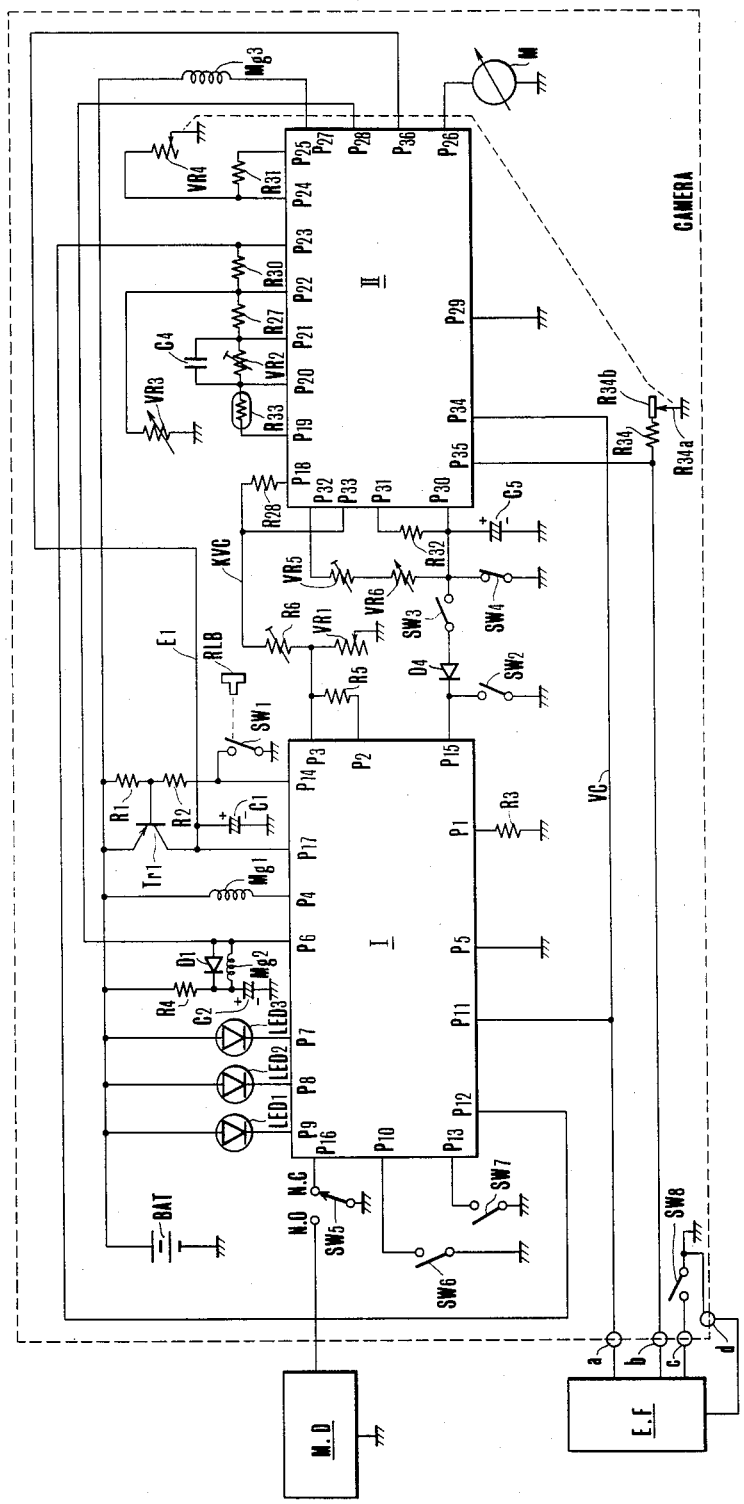
FIGS. 4, 5 and 6 are circuit diagrams showing a single-lens reflex camera included in the electronic flash photographing system as an embodiment of the invention.

Next, referring to FIGS. 4, 5 and 6, the single-lens reflex camera which is used in the flash photographing system shown in FIGS. 1, 2 and 3 are arranged as described below:

FIG. 4 is a block diagram showing the electric circuits of the camera. In this drawing, the portion encompassed with a broken line represents parts disposed within the camera body. A reference symbol MD indicates a motor drive device; and EF the flash device which has been described with reference to FIGS. 1–3. Terminals a, b, c and d are the same terminals that are shown in FIG. 1. In FIG. 4, a block I indicates an LSI (a large scale integrated circuit) consisting of a sequence control part and an automatic exposure control part. The LSI I is provided with input, output and external discrete part connection terminals P1–P17. A block II indicates another LSI consisting of a light measurement part, a computing part and a shutter time control part. The LSI II is also provided with input, output and external discrete part connection terminals P18–P38. The camera includes an information display meter M; electromagnets Mg1, Mg2 and Mg3; a transistor Tr1 of a power supply holding circuit for holding a power supply from a power source battery BAT; display light emitting diodes LED1–LED3; switches SW1–SW7; variable resistors VR1–VR7 which are provided for setting information, etc.; and the power source battery BAT.

The switch SW1 is arranged to turn on when the shutter release button RLB which has been mentioned in the foregoing is depressed to the first stroke position thereof. The switch SW2 turns on when the shutter release button RLB is depressed to the second stroke position thereof. The switch SW3 is arranged to turn on at the time of a bulb exposure. The switch SW4 is arranged to turn off when the shutter is opened. The switch SW6 is a change-over switch for selection between automatic photographing and manual photographing and is arranged to turn on at the time of manual photographing. The switch SW7 is for self-timer photographing and is arranged to turn on when a self-timer is used. The switch SW5 is arranged to alternately effect switchover between a film winding action and the photo-taking action of the camera when the motor drive device MD is used. The switch SW5 shifts its position to one side NC upon completion of the film winding action and to the other side NO upon completion of the travel of a trailing curtain of the shutter. A reference symbol SW8 indicates the synchronizing contact mentioned in the foregoing. The contact SW8 is arranged to turn on when the shutter fully opens. The magnet Mg1 is provided for automatic exposure control; the magnet Mg2 for initiating the operation of the camera; and the magnet Mg3 for shutter time control.

Further, the shutter release button RLB shown in FIG. 4, the terminals a and c which are shown in FIG. 1, the transistor 41, the one-shot circuits 130 and 131, etc. constitute a member which individually actuates a preliminary flashing circuitry 6, 7, 8, etc. and a main flashing circuitry 9, 10, 13, etc.

In the camera shown in FIG. 4, the circuit element II analogically performs light measurement, computation and shutter time control while the circuit element I digitally performs aperture control and sequential control in various photographing modes. The details of these actions will be described later herein with reference to the circuit details shown in FIGS. 5 and 6.

Figure 5:
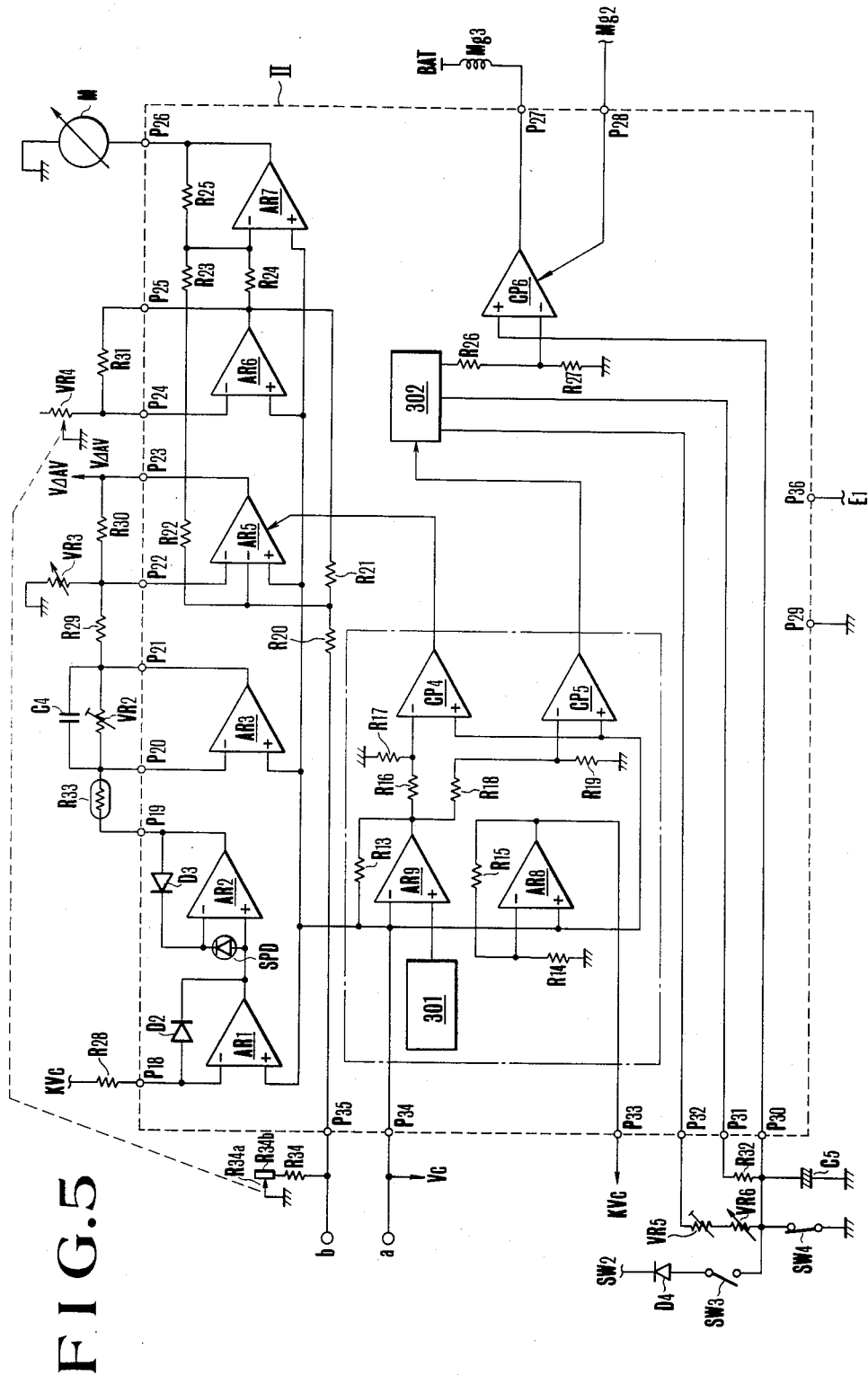

FIG. 5 shows the details of the circuit element II shown in FIG. 4. Referring to FIG. 5, symbols AR1 and AR2 and AR3-AR9 indicate operational amplifiers; and CP4-CP6 indicate comparators. The operational amplifier AR5 and the comparator CP6 are controlled by a control input (arrow). The circuit arrangement includes a constant voltage source 301, a change-over circuit 302, a silicon photo diode SPD for light measurement and a logarithmic diode D3 for obtaining a logarithmic suppression characteristic. An external discrete part R33 is a posistor. A circuit C4 and VR2 is provided for the purpose of eliminating quick variations of light measurement values due to the flicker of a light source illuminating the object to be photographed. The variable resistor VR3 is provided for setting shutter time information and film sensitivity information. The variable resistor VR4 is provided for varying the input of information on the full-open F-number of the lens to be used. The resistance value of the variable resistor VR4 are arranged to be variable with the full-open F-number information by means of a signal transmission pin of the lens which is not shown. A symbol M indicates a display meter; VR5 indicates a variable resistor for adjusting shutter time when the shutter is to be operated at a high speed; VR6 indicates a variable resistor for setting shutter time; R34 indicates a resistor related to information on the full-open F-number of the photo-taking lens to be used; R34a indicates the brush thereof; and R34b indicates the pad surface of the resistor. The brush R34a is arranged to slide over this pad surface in association with the resistor VR4. The brush R34a slides over the pad surface R34b when the full-open F-number of the lens is of a value exceeding an aperture value between the values F1 and F2 shown in FIG. 2(a) and 2(b) and moves away from the pad surface R34b when the F-number is of a value smaller than the aperture value. In other words, when a photo-taking lens of full-open F-number exceeding a given aperture value is mounted on the camera, the resistor R34 comes to be connected between the terminal b and the ground. When a lens of full-open F-number smaller than the given aperture value is mounted on the camera, the resistor R34 is never connected between the terminal b and the ground as one terminal thereof opens under such a condition. A symbol C5 indicates a capacitor of a time constant circuit.

The circuit arrangement shown in FIGS. 4 and 5 operates as described below:

Referring to FIG. 4, when the shutter release button RLB is depressed, the switch SW1 turns on to cause the transistor Tr1 to turn on. With the transistor Tr1 turned on, a power supply is effected through the power supply holding circuit. In the case of flash photographing, the flash device shown in FIGS. 1–3 performs the preliminary flashing action at the commencement of the power supply. With the power supply started, the light receiving photogalvanic element SPD which is shown in FIG. 5 produces a photo-current corresponding to the brightness of the object to be photographed. This photo-current signal is amplified at the operational amplifier AR2 which is provided with the logarithmic characteristic element or log. diode D3 disposed in the feedback path thereof. The amplifier AR2 then produces brightness information BV. To compensate for a change due to temperature variation of the log.diode D3, there are provided the operational amplifier AR1 which has a diode D2 of the same characteristic as that of the diode D3 disposed in its feedback path; and the posistor R33 which is disposed on the output side of the amplifier AR2. The output of the amplifier AR2 is supplied through the posistor R33 to the operational amplifier AR3. The input signal thus supplied to the amplifier AR3 then has its high frequency component attenuated by the characteristics of a capacitor C4 and a resistor VR2. The above stated output variation due to the flicker is thus eliminated from the input signal. The brightness information BV thus obtained through the amplifier AR3 is supplied to the inversion input terminal of the operational amplifier AR5. Meanwhile, shutter time information TV and film sensitivity information SV set at the variable resistor VR3 has been already supplied also to this terminal of the amplifier AR5. These values of information are computed at the amplifier AR5. Through this computation, aperture step-number information V$\Delta$AV is produced at the output terminal of the amplifier AR5. This output is taken out from the terminal P23 and is transmitted to the circuit element I which is shown in FIG. 4 and is arranged to perform sequence control and automatic exposure control. Further, this aperture step-number information V$\Delta$AV is compounded with the full-open F-number information AVO of lens set at the variable resistor VR4 to obtain information AV corresponding to the aperture value. The information AV is displayed by the aperture value display meter M, for example, within a view finder or the like. When the magnet Mg2 which is arranged to perform a starting action on the camera as will be described later herein, the signal thereof is transmitted from the terminal P28 to the comparator CP6 to control the comparator CP6. Then, the terminal P27 produces an output to excite the magnet Mg3. This causes the magnet Mg3 to hold the trailing curtain of the shutter. Further, when the shutter begins to operate, the switch SW4 turns off in response to the start of the leading curtain of the shutter. Then, the capacitor C5 begins to be charged through the resistors VR5 and VR6 of the time constant circuit. At the time of flash photographing, the synchronizing contact SW8 shown in FIG. 4 opens after the shutter fully opens. With the contact SW8 having opened, the main flashing action is performed through the process as described in the foregoing. The terminal voltage of the above stated capacitor C5 is impressed on the non-inversion input terminal of the comparator CP6. This signal and a voltage from the change-over circuit 302 are voltage divided through the resistors R26 and R27. The divided voltage thus obtained is compared with a reference voltage at the comparator CP6. When the two voltages come to coincide with each other, the comparator CP6 is inverted to excite the magnet Mg3 which has been holding the trailing shutter curtain. This allows the trailing curtain to travel. With the photographing operation thus coming to an end, when brake is applied to the trailing shutter curtain, the position of the change-over switch SW5 which is shown in FIG. 4 is shifted to the side NO to reset the circuit. In FIG. 5, a circuit portion enclosed with a one-dot chain line represents a circuit which is arranged to switch over the shutter time circuit to the flash photographing shutter time which information is transmitted from the terminal a of the flash device EF at the time of flash photographing as mentioned in the foregoing with reference to FIGS. 1–3. The amplifier AR5 and the change-over circuit 302 are controlled by the output of this circuit.

More specifically stated, when the main capacitor 9 of the flash device EF shown in FIGS. 1–3 is charged up to a predetermined value and the preparation for flashing is completed, the resistor 56 shown in FIG. 1 comes to be connected between the terminal a and the ground as viewed from the camera side with the transistor 41 turned on. In cases where either the flash device is not connected to the camera or is not ready for flashing, the output of the operational amplifier AR9 (see FIG. 5) is equal to the voltage of the constant voltage source 301. However, with the resistor 56 connected between the terminal a and the ground after completion of preparation for flashing as mentioned above, the output of the operational amplifier AR9 reaches a value which exceeds the voltage of the constant voltage source 301 and is corresponding to the resistance ratio between the resistor 56 and the resistor R13. Since the inversion input terminal of the operational amplifier AR9 is connected to the positive input terminals (+) of the comparators CP4 and CP5, the voltage of the positive input terminals is equal to the voltage of the constant voltage source 301. Meanwhile, since connection points between the resistors R16 and R17 and between the resistors R18 and R19 are respectively connected to the negative input terminals (−) of the comparators CP4 and CP5, the output levels of these comparators CP4 and CP5 become LL upon completion of the preparation for flashing. With the output levels of these comparators changed to LL, the conditions of the amplifier AR5 and the change-over circuit 302 which are connected to the output terminals of these comparators CP4 and CP5 are shifted to other conditions and the feedback resistor of the amplifier AR5 is shifted to the resistor R22. In other words, at the time of flash photographing, a voltage corresponding to the above stated aperture value is impressed on the resistor R20 through the terminal b of the flash device EF. The voltage thus impressed is computed by the operational amplifier AR5 through the resistors 21 and 22. Then, the amplifier AR5 produces therefrom aperture step-number information V$\Delta$AV for flash photography. The outputs of amplifiers AR5 and AR6 are further computed through resistors 23–25 and the operational amplifier AR7. The aperture information from the flash device which is impressed on the terminal b is then displayed by the meter M. The change-over circuit 302 is arranged such that the output of the comparator CP5 is impressed on the variable resistor VR5 when the output is at a high level and on the resistor R32 when it is at a low level. In other words, upon completion of the preparation of the flash device for flashing, the magnet Mg3 is controlled by the shutter time for flash photography corresponding to a time constant determined by the resistor R32 and the capacitor C5. Under conditions other than the flashing preparation completed condition, the magnet Mg3 is controlled according to a time constant of the shutter time information resistor VR6, the variable resistor VR5 and the capacitor C5 (or a time constant corresponding to a setting value set by a shutter dial which is not shown).

Figure 6:
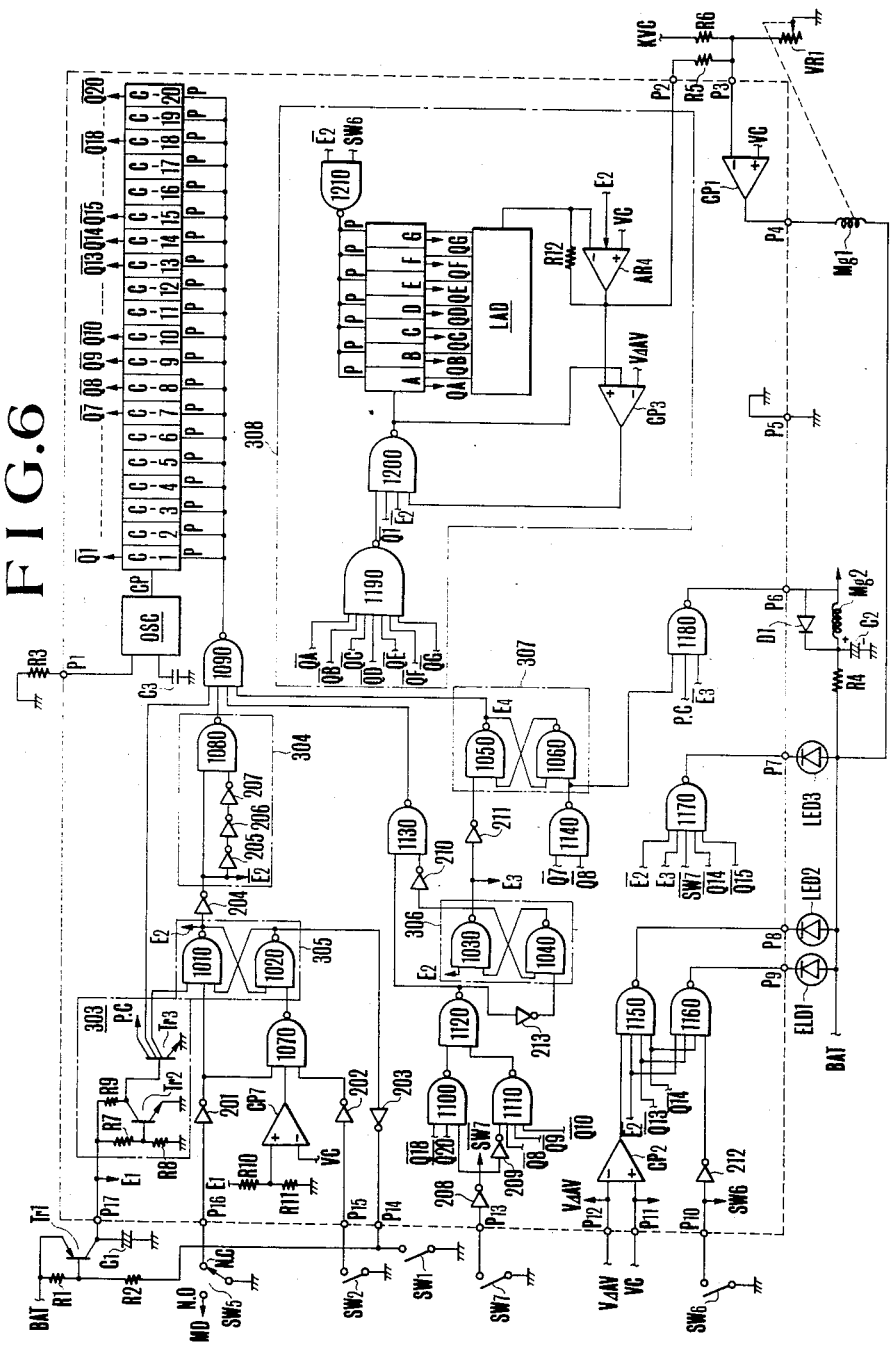

FIG. 6 is a circuit diagram showing the details of a portion of the circuit element I shown in FIG. 4. This portion is formed as a digital control circuit. This circuit is provided with terminals P1–P17 to which external discrete parts or circuits are connected as shown in FIG. 6. The circuit includes binary counters C-1–C-20 which are provided with preset input terminals P; outputs $\overline{Q1}$–$\overline{Q20}$; and a clock pulse input terminal CP. The counters are arranged such that when an input P is at a high level (HL), the level of output Qn becomes HL and that of the output $\overline{Qn}$ a low level (LL). A clock pulse oscillator OSC is arranged to produce clock pulses at a period which is determined by the time constant of a resistor R2 and a capacitor C2. An AD–DA converter 308 is provided with binary counters A–G and a resistor circuit network LAD. A reference numeral 303 indicates a power up clear circuit; 304 indicates a one-shot circuit; 305, 306 and 307 respectively indicate flip-flop circuits; 1010–1210 indicate NAND gates; and 201–213 indicate inverters. A reference symbol AR4 indicates an operational amplifier; CP1, CP2, CP3 and CP7 indicate comparators; and VR1 is an aperture information setting variable resistor which is arranged to operate in relation to the aperture value of a lens (not shown).

Now, with reference to FIG. 6, the operation of the camera is further described as follows:

(1) Let us assume that the camera is in a state of having completed a film winding action; that the shutter release button RLB (see FIG. 4) is in a state of being depressed to the first stroke position thereof; and that, with the film winding action completed, the position of the switch SW5 has been shifted from the side NO to the other side NC. With the button RLB thus depressed to the first stroke position, the switch SW1 turns on and the transistor Tr1 of the power supply circuit also turns on to render the circuit operative. Under this condition (E1 becomes HL), the clock pulse oscillator OSC operates to supply clock pulses to the counter C-1. Meanwhile, when E1 is supplied to the circuit, the capacitor C1 is charged therewith. With the capacitor C1 thus charged, the transistor Tr2 remains off at the beginning and then comes to momentarily turn on. This causes the output level of the power up clear circuit 303 to momentarily become LL. Then, the output level of the NAND gate 1090 momentarily becomes HL to preset the counters C-1–C-20. The flip-flop (FF) 305 is also preset into an initial state, i.e. E2 is preset at HL. Further, the inversion output $\overline{E2}$ of the E2 then set the flip-flop 306 into its initial state to cause the level of its output $\overline{E3}$ to become HL. Then, the inversion output E3 of the output $\overline{E3}$ sets the flip-flop into an initial state to have the level of its output E4 set at HL. This causes the level of preset input of the AD–DA converter 308, i.e. the output level of the NAND gate 1210, to become HL. The counters A–G are thus preset. Further, since the output E2 is at HL, the operational amplifier AR4 is controlled thereby and the output of the amplifier is connected to the ground. At this instant, since the output level of the comparator CP1 is at HL, the magnet Mg1 is not excited under this condition. Through these processes, the levels of the outputs E1, E2, E3 and E4 are all HL under the condition described above.

(2) In case where the camera is to be operated in a manual photographing mode under the condition (1) described above, the switch SW6 is turned on. With the switch SW6 turned on, the output level of the inverter (IV) 212 become HL. When the capacitor C1 is charged, the above stated transistor Tr2 turns off to cause one of the inputs of the NAND gate 1090 to become HL. Since the levels of all other inputs of the NAND gate 1090 are HL at that instant, the output level of the NAND gate 1090 immediately changes from HL to LL. Therefore, the counters C-1–C-20 begin to perform a counting action. When the levels of both the counter outputs $\overline{Q13}$ and $\overline{Q14}$ become HL, therefore, the levels of all inputs of the NAND gate 1160 becomes HL and the NAND gate 1160 produces an LL output. This causes through the terminal P9 the light emitting diode LED1 to produce an output. The light emitting diode LED1 then lights up to indicate that the camera is in the manual photographing mode.

(3) When the light from the object is below a reference value under the condition (1) or (2) described above: Since the light measurement circuit shown in FIG. 5 begins to operate when the switch SW1 is caused to turn on by the depressing operation on the shutter release button RLB as mentioned in the foregoing, the aperture step-number information V$\Delta$AV supplied from the light measurement circuit to the terminal P12 is compared with a reference voltage VC. Then, since the information V$\Delta$AV is lower than the reference voltage VC, the output level of the comparator CP2 becomes HL. Since the counters are in operation as mentioned above, the input levels of the NAND gate 1150 all become HL when the levels of both the outputs $\overline{Q13}$ and $\overline{Q14}$ become HL. Then, the output level of the NAND gate 1150 becomes LL. This causes the light emitting diode LED2 which is connected to the terminal P8 to light up to indicate and give a warning that the brightness of the object is low. The lights emitted from these diodes LEDs flicker according to the period of the counters and are arranged to be displayed, for example, within a view finder.

(4) After confirmation of the low brightness, the automatic photographing mode or the manual photographing mode through the processes of Para. (2) and/or (3) above, when a photographing action is initiated by depressing the shutter release button RLB to the second stroke position thereof, the embodiment operates as follows: The switch SW2 turns on in response to the depressing operation to the second stroke position. With the switch SW2 on, the output level of the inverter 202 becomes HL. Further, since the switch SW8 is in connection with the side NC, the output level of the inverter 201 is also HL. Under this condition, the divided voltage of the voltage E1 of the power source is compared with the constant voltage VC at the comparator CP7. Then, if the divided voltage value of the voltage E1 is sufficiently higher than the constant voltage VC (if the power source voltage is sufficiently high), the output level of the comparator CP7 is at HL. Therefore, levels of all inputs of the NAND gate 1070 are HL and the NAND gate 1070 produces an LL output. This causes the output level of the NAND gate 1020 to become HL. Therefore, the flip-flop 305 is inverted and the level of its output E2 changes from HL to LL. The output of the NAND gate 1020 causes the output level of the inverter 203 to change from HL to LL. Then, through the terminal P14, this causes the base resistors R1 and R2 of the transistor Tr1 to be connected to the ground. Therefore, the transistor Tr1 is kept on even when the switch SW1 is turned off, so that the power supply to the circuit can be maintained. Since the level of the output E2 of the flip-flop 305 thus becomes LL, the level of the output $\overline{E2}$ of the inverter 204 becomes HL. The output level of the one-shot circuit 304 then becomes LL just for the length of a delay time caused by the inverters 205, 206 and 207. Accordingly, the output level of the NAND gate 1090 momentarily becomes HL. The counters C-1–C-20 are again preset. After that, the level of the NAND gate 1090 changes from HL to LL. The clock pulses CP from the clock pulse oscillator OSC then begin to be counted. Further, with the level of the output E2 having become LL, the operation amplifier AR4 of the AD-DA converter 308 is released from control and the output of the amplifier AR4 is transmitted to the input terminal of the comparator CP1. Since the output of the amplifier AR4 corresponds to the set state of the counters A–G, the potential of the inversion input terminal of the comparator CP1 becomes high. This, therefore, inverts the comparator CP1 to excite the magnet Mg1 for automatic exposure control. Under this condition, the level of the input signal $\overline{E2}$ to the NAND gate 1200 is HL; that of the output of the comparator CP3 is HL; and that of the output of the NAND gate 1190 is also HL. Therefore, the signal of the output $\overline{Q1}$ of the counter C-1 is transmitted to the counters A–G of the AD-DA converter through the NAND gate 1200.

(5) When the camera is shifted to the manual photographing mode under the above stated condition (switch SW6 is on), the output level of the NAND gate 1210 of the converter 308 is at HL while the counters A–G are kept in a preset state. Further, if the camera is shifted to the automatic photographing mode under that condition (the switch SW6 is off), the output level of the NAND gate 1210 changes from HL to LL and the counters A–G begin to count. This causes the output of the operational amplifier AR4 to lower stepwise. When the signal V$\Delta$AV from the light measurement circuit and this output of the amplifier AR4 become equal to each other, the comparator CP3 is inverted to produce an LL signal. The NAND gate 1200 produces an HL output irrespectively of the output $\overline{Q1}$ of the counter C-1. This brings the counting action of the counters A–G to an end. Then, a digital value corresponding to the signal V$\Delta$AV is stored at the counters A - G. Any adverse effect due to noises produced during the counting action of the counters can be eliminated by controlling the comparator CP3 with the output of the NAND gate 1200.

(6) When a self-timer is used under the condition of Para. (4) above: In this case, the switch SW7 is turned on. The output level of the inverter 208 is HL. Therefore, the output level of the NAND gate 1100 changes from HL to LL when the levels of both counter outputs $\overline{Q18}$ and $\overline{Q19}$ become HL. This causes the NAND gate 1120 to produce an HL output. The output level of the inverter 213 becomes LL. The level of E2 is also caused to become LL by the depressing operation on the shutter release button RLB to the second stroke position thereof. Accordingly, the level of the E2 is at HL. Therefore, the flip-flop 306 is inverted and its output E3 changes from HL to LL. This causes the NAND gate 1130 to produce an LL output. The output level of the NAND gate 1090 becomes HL to again preset the counters C-1–C-20. When the counters are preset, the levels of outputs $\overline{Q1}$–$\overline{Q20}$ become LL. Therefore, the level of the NAND gate 1120 becomes LL and that of the NAND gate 1130 returns to HL. Then, the output level of the NAND gate 1090 becomes LL and the count begins again. Therefore, the level of the NAND gate 1180 becomes LL after the level of E2 changes from HL to LL and remains at LL until the levels of both the outputs $\overline{Q7}$ and $\overline{Q8}$ become HL. With the level of the NAND gate 1180 becoming LL, the magnet Mg2 is excited to actuate a camera starting member which is not shown. Then, a photo-taking action begins. With the self-timer used, therefore, the shutter time control pulses are delayed by counting time of the counters after the release button RLB (see FIG. 4) is brought to its second stroke position until the levels of the outputs $\overline{Q18}$ and $\overline{Q20}$ both become HL.

(7) Where the self-timer is not used and the camera is in the automatic photographing mode: The switch SW7 is off. Accordingly, the output level of the inverter 208 is LL and that of the inverter 209 HL. The output level of the NAND gate 1110 changes from HL to LL when all the levels of the counter outputs $\overline{Q8}$, $\overline{Q9}$ and $\overline{Q10}$ become HL. Therefore, the level of the output E3 of the flip-flop 306 changes from HL to LL when all the levels of the counter outputs $\overline{Q8}$, $\overline{Q9}$ and $\overline{Q10}$ become HL after the release button RLB is brought to the second stroke position thereof. In other words, when the self-timer is not used, the camera starting member (not shown) is actuated in a shorter period of time than when the self-timer is used as mentioned above because the level of the output E3 of the flip-flop 306 becomes LL when the levels of the counter outputs $\overline{Q8}$, $\overline{Q9}$ and $\overline{Q10}$ become HL after the release button RLB comes to the second stroke position thereof. Further, when the level of E2 becomes LL with the release button RLB coming to the second stroke position, the output levels of both the NAND gates 1150 and 1160 become HL to extinguish the displays of the light emitting diodes LED1 and LED2.

Further, with the self-timer in use, when the level of E2 becomes LL, the level of $\overline{E2}$ becomes HL. When the switch SW7 turns on while the level of E2 is HL, the output level of the NAND gate 1170 becomes LL after both the levels of the counter outputs $\overline{Q14}$ and $\overline{Q15}$ become HL. This LL output of the NAND gate 1170 then causes the light emitting diode LED3 to flicker through the terminal P7. The flicker of the diode LED3 indicates that the self-timer is in use. Upon completion of the self-timer action, the level of E3 becomes LL. The output level of the NAND gate 1170 becomes HL to extinguish the diode LED3. When the level of E3 thus changes from HL to LL after completion of the self-timer action as mentioned above, the output level of the inverter 211 becomes HL and the level of the output E4 of the flip-flop 307 becomes HL. Since the level of $\overline{E3}$ is HL, the output level of the NAND gate 1180 becomes LL until the levels of both counter outputs $\overline{Q7}$ and $\overline{Q8}$ become HL. Further, with the photographing operation of the camera started after the camera starting magnet Mg2 is excited as mentioned in the foregoing, when the levels of both the counter outputs $\overline{Q7}$ and $\overline{Q8}$ become HL, the output level of the NAND gate 1140 becomes LL to cut off the exciting action on the magnet Mg2. Further, when the magnet Mg2 is excited, the excitation signal of the magnet Mg2 is impressed on the control terminal P28 of the comparator circuit CP6 shown in FIG. 5. The output level of the comparator circuit CP6 then becomes LL to excite the magnet Mg3. This causes the magnet Mg3 to hold the trailing shutter curtain. At the same time, the flip-flop 307 is inverted and the level of the output E4 changes from HL to LL. This causes the output level of the NAND gate 1090 to become HL to bring the counters C-1–C-20 into a preset state. Through the processes described above, the magnet Mg2 is excited; the camera starting member (not shown) is actuated thereby to initiate a photographing operation; in response thereto, a mirror is uplifted and the variable resistor VR1 for aperture information is unlocked by known members; a diaphragm driving member which is not shown is actuated to stop down the diaphragm aperture; accordingly, the slider of the variable resistor VR1 moves; the output of the amplifier AR4 and the reference value VC are compared at the comparator CP1; when they come to coincide with each other, the output level of the comparator CP1 changes to HL to excite the magnet Mg1 for automatic exposure control; and the diaphragm aperture of the photo-taking lens is clamped to determine the aperture value of the photo-taking lens. Then, a member which is not shown causes the leading shutter curtain to travel. The travel of the leading shutter curtain causes the switch SW4 shown in FIG. 5 to turn off. The capacitor C5 is charged through resistors VR5 and VR6. After the lapse of set shutter time, the comparator CP6 is inverted to no longer excite the magnet Mg3. This allows the trailing shutter curtain to travel and the photographing operation comes to an end.

With the flash device EF connected to the camera shown in FIGS. 4–6 through the terminals a, b, c and d shown in FIG. 4 and when the flash device is in a state of having completed preparation for flashing as described in the foregoing, the output V$\Delta$AV of the operational amplifier AR5 shown in FIG. 5 is of a value corresponding to the aperture information voltage impressed on the terminal b from the flash device. The same voltage V$\Delta$AV is also applied to the negative input terminal (−) of the comparator CP3 shown in FIG. 6. Therefore, the content of the aperture information produced from the flash device is analog-to-digital converted by the A/D converter 308. Then, the magnet Mg1 for automatic exposure control is controlled in the same manner as in the case of not using the flash device to determine the aperture value of the photo-taking lens as described in the foregoing.

After completion of the photographing operation of the camera, the switch SW5 is shifted from the side NC to the other side NO in response to the travel of the trailing shutter curtain. The motor drive device MD then begins to perform a film winding action. Under this condition, the output level of the inverter 201 becomes LL. The flip-flop 305 is inverted and the level of the output E2 changes from LL to HL. The output level of the inverter 203 also changes from LL to HL. Accordingly, if the switch SW1 is off, the transistor Tr1 is turned off to release the power source from the power supplying condition and the camera is thus brought back to the condition existed before the commencement of photographing.

While the foregoing description has covered noncontinuous photographing operations, a continuous photographing operation with the motor drive device is performed in the following manner: In this case, since the shutter release button RLB is depressed and kept in the second stroke position thereof, the switches SW1 and SW2 are kept on. Therefore, when the switch SW5 is shifted from the side NC to the side NO to make the level of E2 HL as mentioned in the foregoing after completion of one photographing action of the camera, the level of $\overline{E2}$ becomes LL. The flip-flop 306 is inverted and the level of E3 becomes HL. This causes the flip-flop 307 to be inverted to make the level of E4 become HL. The output level of the NAND gate 1090 then changes from HL to LL. The counters C-1–C-20 resume their counting action and this results in the display action as mentioned in the foregoing.

Under this condition, since the switches SW1 and SW2 are on, the transistor Tr1 is kept on to have the power supply from the power source BAT uninterrupted. Therefore, when the switch SW5 is shifted to the side NC after completion of the film winding action, the output level of the inverter 201 changes from LL to HL. The flip-flop 305 is inverted to change the level of E2 from HL to LL. This causes the level of $\overline{E2}$ to change from LL to HL. Accordingly, the one-shot circuit 304 momentarily produces an LL output as mentioned in the foregoing. After that, the camera operates in the same sequence as described in the foregoing.

Figure 7:
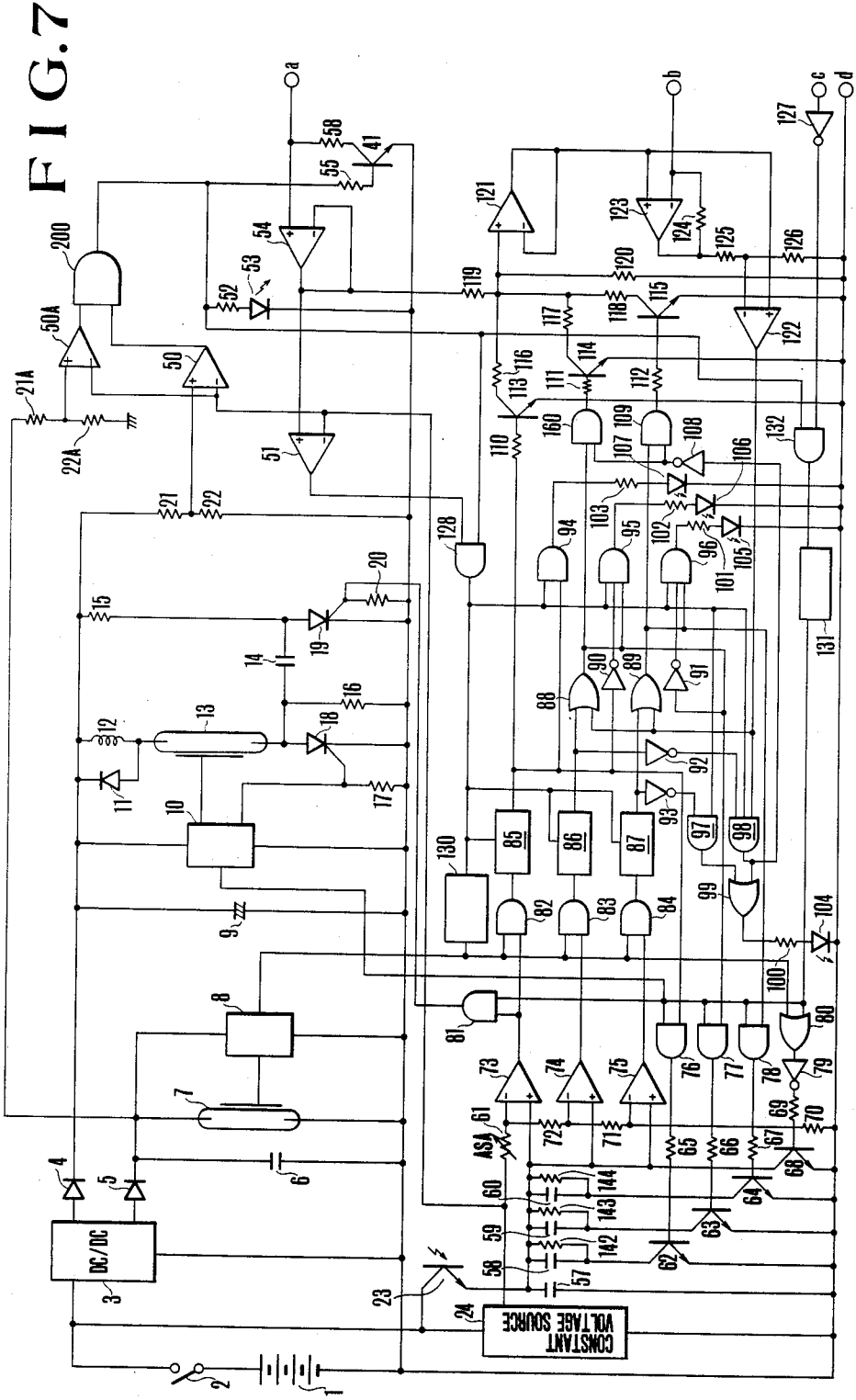
FIG. 7 is a circuit diagram showing an electronic flash device included in an electronic flash photographing system as another embodiment of the invention.

A second embodiment of the invention is as shown in FIG. 7. The following description of the second embodiment covers only the starting conditions for flash photographing in which the second embodiment differs from the first embodiment while other details which are identical with those of the first embodiment and, therefore, are omitted from the following description:

Referring now to FIG. 7, resistors 21 and 22 of a voltage dividing circuit are parallel connected to a main capacitor 9 for the purpose of detecting the charge voltage of the main capacitor. The output terminal of the voltage dividing circuit 21 and 22 is connected to a comparator 50. The negative input terminal (−) of the comparator 50 and that of a comparator 51 are connected to the output terminal of a constant voltage source 24 to receive a reference voltage therefrom. A resistor 22A of a voltage dividing circuit is connected to an auxiliary capacitor 6 through a resistor 21A. The output terminal of the voltage dividing circuit is connected to the positive input terminal (+) of a comparator 50A which is provided for determining the charge level of the auxiliary capacitor 6. An AND gate 200 is connected to the output terminals of the comparators 50 and 50A. A light emitting diode (LED) 53 is connected to the output terminal of the AND gate 200 through a resistor 52 and is arranged to indicate completion of charging processes on the main capacitor 9 and the auxiliary capacitor 6.

In the embodiment shown in FIG. 7, when the power supply switch 2 is closed after the electronic flash device is mounted on the hot shoe (not shown) of the camera, the DC–DC converter 3 and the constant voltage source 24 begin to operate. The main capacitor 9, the auxiliary capacitor 6, etc. begin to be charged. When the charge voltage level of the main capacitor 9 reaches a predetermined value, the output level of the comparator 50 changes from LL to HL. When the charge voltage level of the auxiliary capacitor 6 reaches a predetermined value, the output level of the comparator 50A changes from LL to HL. Then, the output level of the AND gate 200 which is arranged to receive the output signals of both the comparators 50 and 50A also changes from LL to HL to cause thereby the LED 53 to light up. With the LED 53 thus caused to light up, the photographer is informed that both the main and auxiliary capacitors are completely charged. Meanwhile, the AND gate 200 impresses a high level voltage also on the base of the transistor 41. This causes the transistor 41 to change to a conductive state.

Under this condition, when the photographer depresses the shutter release button (not shown) to the first stroke position thereof, a constant voltage is impressed on the terminal a through the hot shoe of the camera. Meanwhile, with the release button depressed to the first stroke position, only the light measurement circuit, a display circuit, etc. begin to operate within the camera while the shutter release action and the aperture adjusting action on the photo-taking lens do not begin as will be described later herein. With the constant voltage impressed on the terminal a, this renders the transistor 41 conductive to shift the mode of the shutter time control circuit within the camera from a natural light photography mode to a flash photography mode. In the meantime, the constant voltage which is produced at the terminal a is impressed also on the positive input terminal (+) of the comparator 51 through the buffer circuit 54. This causes the output level of the comparator 51 to change from LL to HL. Then, the output level of the AND gate 128 also changes from LL to HL. With the output level of the AND gate thus changed to HL, the one-shot circuit 130 is triggered to have the circuit 130 produce an HL output voltage for a length of predetermined time which is several tens of $\mu$s. The trigger circuit 8 is triggered the instant pulses are produced from the one-shot circuit 130. The trigger circuit 8 then produce from its output terminal a trigger pulse to trigger the auxiliary discharge tube 7. Since the auxiliary capacitor 6 has been charged to a sufficiently high voltage by then, a current flows from the capacitor 6 to the auxiliary discharge tube 7 when the trigger pulse is applied thereto. Then, preliminary flashing begins. Further, if either the main capacitor 9 or the auxiliary capacitor 6 has not been completely charged, the preliminary flashing is not performed even if the shutter release button is depressed as mentioned above, because, under such a condition, the output level of the AND gate 200 is kept at LL. Further, it goes without saying that, under such a condition, the photographing mode is not shifted.

Meanwhile, since the pulses from the one-shot circuit 130 are also impressed on the AND gates 82–84 and OR gate 80, the AND gates 82–84 come to be in a waiting state. The transistor 68 becomes nonconductive. The short-circuit of the distance measurement capacitor 57 is removed. The distance measuring light measurement circuit then begins to operate at the same time as the commencement of the preliminary flashing. Since no light emitting trigger signal of LL has been impressed on the synchronization terminal c at that point of time, transistors 62–64 all remain nonconductive and the capacitors 58–60 for light control are all in an inoperative state.

When the light produced from the discharge tube 7 by the preliminary flashing is reflected by the object to be photographed and comes to the photo-transistor 23, the output current of the distance measurement capacitor 57 increases with the lapse of time according to a photo-current flowing from the photo-transistor 23.

Further, the charge voltage of the capacitor 57 also increases according to the intensity of a natural light illuminating the object as shown in FIG. 3(a) even after the end of the flashing by the discharge tube 7. (Referring to FIG. 3, a curve 1 represents the variation of charge voltage of the capacitor 57 which takes place in case where light measurement is carried out for a period of several tens of μs; the brightness of the natural light illuminating the object is low; and the distance to the object is within a medium distance range. A curve 2 represents the variation which takes place in case where the light measuring length of time is the same; the object is located at a long distance; and the brightness of the natural light is high. Another curve 3 represents the variation in another case where the light measuring length of time is the same; the object is located at a distance within the medium distance range; and the brightness of the natural light is high.) In this distance measuring process, the charge voltage of the capacitor 57 is latched at the latch circuits 85–87 as distance information by the change of the output level of the one-shot circuit 130 after the lapse of several tens of μs from the commencement of the preliminary flashing. If the distance to the object is within the distance range from d2 (m) to d3 (m) as shown in FIG. 2(a) and if the charge voltage of the capacitor 57 causes the output level of the comparator 75 alone to become HL, it is only the output level of the latch circuit 87 that becomes HL. In such a case, therefore, the output levels of the output terminals of the OR gate 89 and AND gate 109 respectively become HL. The transistor 115 alone becomes conductive to parallel connect the resistor 118 to the resistor 120. When the resistor 118 which is provided for setting an aperture value F1, such as F 2.0, is thus connected to the resistor 120, the potential of the positive input terminal of the buffer circuit 121 drops according to the resistance value of the resistor 118 parallel connected to the resistor 120. Then, the potential of the non-inversion input terminal of the amplifier 123 also drops accordingly. As a result of that, such a voltage that causes the aperture of the photo-taking lens of the camera to become the aperture value F1 is produced at the terminal b. Further, when the output level of the OR gate 89 becomes HL as mentioned above, the output level of the AND gate 78 becomes HL and the transistor 64 becomes conductive. In other words, the flash light quantity control circuit of the flash device comes to be set at the above stated aperture value.

When the output level of the OR gate 89 becomes HL as mentioned above, the output level of the AND gate 128 is at HL and that of the latch circuit 86 is at LL. Therefore, the output level of the AND gate 96 also become HL. Then, the LED 105 lights up to inform the photographer that the aperture of the photo-taking lens of the camera and the light control level (aperture value) of the flash device will be adjusted to the above stated aperture value F1.

The rest of the operation of the second embodiment is substantially the same as that of the first embodiment and, therefore, is omitted from the description here.

In accordance with the second embodiment, completion of preparation for flashing is arranged to be displayed only when both the main capacitor for main flashing and the auxiliary capacitor for preliminary flashing are completely charged. This arrangement prevents the photographer from prematurely initiating a flash photographing operation, so that flash photographing can be always performed in an appropriate manner.

Further, the light control level is arranged to be set by measuring the reflection light from the object resulting from preliminary flashing simultaneously with the reflection light resulting from the natural light of the background of the object. Then, the aperture of the camera is set concurrently with the light control level and the flash device is arranged to have its light controlled according to the aperture value. This arrangement, therefore, enables the photographer to obtain not only a proper exposure for the main object to be photographed but also a proper exposure for the background thereof.

In accordance with the invention, preliminary flashing and main flashing are individually triggered, so that the recycle time of the operation of the device can be shortened. In the conventional devices, the depth of field becomes deeper when the object to be photographed is located at a short distance. Whereas, in the case of the present invention, it is possible to carry out flash photographing for an object located at a short distance with a shallow depth of field obtained at a small aperture determined by preliminary flashing on the basis of the background located at a longer distance. Therefore, a picture of shallow depth of field can be obtained as desired even when the object to be photographed is located at a short distance. In other words, the arrangement according to the invention to individually trigger the preliminary flashing and the main flashing enables the photographer to select the depth of field as desired.

Further, in addition to these advantageous features of the invention, arrangement to lessen the aperture value to be set at the flash light quantity control circuit according as the distance to the object becomes longer gives another advantage that photographs of proper exposure are obtainable over a wide range of distance to the object.

Further, arrangement to permit confirmation of preliminary flashing by arranging the wave length of the flash light produced from the discharge tube 7 to be a visible light will enable the photographer to have preliminary flashing performed once again. Such arrangement then results in increased probability for obtaining photographs of proper exposure.

In the embodiments described in the foregoing, the means for triggering the preliminary flashing, such as the elements 8, 130, 128, 51, 54, etc., are disposed within the electronic flash device. However, the invention is not limited to such arrangement and the triggering means alone may be disposed outside of the flash device and may be arranged in the form of an adapter.

Further, the discharge tube 7 for preliminary flashing and the main discharge tube 13 for main flashing may be replaced with one common discharge tube by arranging it to serve for both purposes through provision of an additional circuit for obtaining the same advantages.

What we claim is:

1. A photographic system comprising a camera and a flash device, said system comprising:
   (a) flash means, responsive to a shutter release actuating member having a first operating state and a second operating state in which an exposure control operation is initiated, for providing a preliminary flash when the member is in the first state and a main flash as the start of an exposure when in the second state;
   (b) signal forming means for producing a first signal corresponding to the reflection of the preliminary flash from an object to be photographed and a second signal corresponding to the reflection of the main flash from the object;

(c) a diaphragm control circuit to control the diaphragm on the basis of said first signal when the exposure control operation is initiated by the operation of said release actuating member; and (d) a circuit for detecting said second signal for stopping the projection of a main flash onto the object when the second signal reaches a condition representing that the amount of reflected light takes a prescribed value.

2. A photographic system according to claim 1, wherein said flash means has a first trigger circuit for actuating the preliminary flash, and a second trigger circuit for actuating the main flash separately.

3. A photographic system according to claim 1, wherein said flash means has a capacitor for storing energy to carry out the main flash and enabling means for allowing the preliminary flash to be carried out by said release actuating member when the charge level on said capacitor is above a prescribed value.

4. A photographic system according to claim 1, wherein said flash means has a first capacitor for storing energy to carry out the main flash, a second capacitor for storing energy to carry out the preliminary flash, and enabling means for allowing the preliminary flash to be carried out when the charge level on each capacitor is above a respective prescribed value.

5. A computer type electronic flash device for a camera comprising:
(a) flash means responsive to a first operation state of a shutter release actuating member and a second operation state of said member at which an exposure control operation of the camera is initiated, for providing a preliminary flash in response to the first state of the member and subsequently to the second state of the member for providing a main flash as the exposure starts;
(b) signal forming means for producing a first signal corresponding to the reflection of the preliminary flash from an object to be photographed and a second signal corresponding to the reflection of the main flash from the object;
(c) transmitting means for transmitting a control signal, based on the first signal to a diaphragm control circuit of the camera to control the diaphragm when the exposure control operation is initiated by the operation of said release actuating member so that the size of aperture opening of the diaphragm is adjusted in accordance with the control signal; and
(d) a circuit receptive of the second signal and responsive to attainment of the amount of main flash reflected from the object to a predetermined level for stopping illumination on the object with the main flash.

6. A device as in claim 5, further comprising a first trigger circuit for actuating the preliminary flash, and a second trigger circuit for actuating the main flash separately.

7. A device as in claim 5, further comprising a capacitor for storing energy to carry out the main flash and enabling means for allowing the preliminary flash to be carried out by said release actuating member when the charge level on said capacitor is above a prescribed value.

8. A device as in claim 5, further comprising a first capacitor for storing energy to carry out the main flash, a second capacitor for storing energy to carry out the preliminary flash, and enabling means for allowing the preliminary flash to be carried out when the charge level on each capacitor is above a respective value.

9. A camera system with a camera and a flash device comprising:
(a) a first switch responsive to manual actuation for causing flash means to emit preliminary flash prior to making of an exposure;
(b) a second switch responsive to a photographic operation by a manual release actuation other than said manual actuation for the preliminary flash for causing said flash means to emit a main flash;
(c) signal forming means receptive of the reflection of said preliminary flash from the object for producing a first signal;
(d) a memory circuit for memorizing the output of said signal forming circuit;
(e) a light amount adjusting circuit for detecting the amount of light by the main flash and for comparing a signal representing said amount of light with a memorized value of said memory circuit to stop the main flash when the signal representing the amount of light falls in a prescribed relation to the memorized value of said memory circuit.

10. A computer type electronic flash device for a camera comprising:
(a) flash means responsive to a shutter release actuating member reaching a first position and subsequently reaching a second position, at which an exposure control operation of the camera is initiated, for providing a preliminary flash in response to the member reaching the first position and subsequent to the member reaching the second position providing a main flash as the exposure starts;
(b) signal forming means for producing a first signal corresponding to the reflection of the preliminary flash from an object to be photographed and a second signal corresponding to the reflection of the main flash from the object;
(c) transmitting means for transmitting a signal based on the first signal to a diaphragm control circuit of the camera to control the diaphragm when the exposure control operation is initiated by the operation of said release actuating member so that the size of aperture opening of the diaphragm is adjusted in accordance with this signal; and
(d) a circuit receptive of the second signal and responsive to attainment of the amount of main flash reflected from the object to a predetermined level for stopping illumination on the object with the main flash.

11. A camera system comprising:
(A) a camera having:
(a) a release actuating member, said member when operated from an initial position moving to a first position and when further operated moving to a second position;
(b) a diaphragm control circuit operating in response to movement of said actuating member to the second position to adjust the size of aperture opening in accordance with the signal applied thereto; and
(c) shutter control means arranged to start to operate after the adjustment of the diaphragm by said diaphragm control circuit; and
(B) a flash device having:

(a) flash means responsive to movement of said actuating member for providing preliminary flash, and responsive to operation of said shutter control means for providing main flash;

(b) signal forming means for producing a first signal corresponding to the reflection of the preliminary flash from an object to be photographed and a second signal corresponding to the reflection of the main flash from the object;

(c) transmitting means for transmitting a signal based on the aforesaid first signal to be applied as the aforesaid input signal to said diaphragm control circuit; and (d) a circuit receptive of the second signal and responsive to attainment of the amount of main flash reflected from the object to a predetermined level for stopping illumination on the object with the main flash.

12. A device as in claim 10, wherein:
said flash device has a first trigger circuit for actuating the preliminary flash, and a second trigger circuit for actuating the main flash separately.

13. A device as in claim 11, wherein:
said flash device has a first trigger circuit for actuating the preliminary flash, and a second trigger circuit for actuating the main flash separately.

14. A device as in claim 10, wherein:
said flash device has a capacitor for storing energy to carry out the main flash and enabling means for allowing the preliminary flash to be carried out by said release actuating member when the charge level on said capacitor is above a prescribed value.

15. A device as in claim 11, wherein:
said flash device has a capacitor for storing energy to carry out the main flash and enabling means for allowing the preliminary flash to be carried out by said release actuating member when the charge level on said capacitor is above a prescribed value.

16. A device as in claim 10, wherein:
said flash device has a first capacitor for storing energy to carry out the main flash, a second capacitor for storing energy to carry out the preliminary flash, and enabling means for allowing the preliminary flash to be carried out when the charge level on each capacitor is above a respective prescribed value.

17. A device as in claim 11, wherein:
said flash device has a first capacitor for storing energy to carry out the main flash, a second capacitor for storing energy to carry out the preliminary flash, and enabling means for allowing the preliminary flash to be carried out when the charge level on each capacitor is above a respective prescribed value.

* * * * *